United States Patent
Chen

(10) Patent No.: US 7,403,928 B2
(45) Date of Patent: Jul. 22, 2008

(54) IDENTIFY DATA SOURCES FOR NEURAL NETWORK

(75) Inventor: Dingguo Chen, Eden Prairie, MN (US)

(73) Assignee: Siemens Power Transmission & Distribution, Inc., Wendell, NC (US)

( * ) Notice: Subject to any disclaimer, the term of this patent is extended or adjusted under 35 U.S.C. 154(b) by 59 days.

(21) Appl. No.: 11/345,438

(22) Filed: Feb. 1, 2006

(65) Prior Publication Data

US 2006/0184472 A1    Aug. 17, 2006

Related U.S. Application Data

(60) Provisional application No. 60/649,677, filed on Feb. 3, 2005, provisional application No. 60/649,877, filed on Feb. 3, 2005, provisional application No. 60/649,876, filed on Feb. 3, 2005, provisional application No. 60/649,803, filed on Feb. 3, 2005.

(51) Int. Cl.
    *G06E 1/00*   (2006.01)
    *G06E 3/00*   (2006.01)
    *G06F 15/18*  (2006.01)
    *G06G 7/00*   (2006.01)

(52) U.S. Cl. ........................................................ 706/15
(58) Field of Classification Search .................... 706/15
    See application file for complete search history.

(56) References Cited

U.S. PATENT DOCUMENTS

| 5,297,015 A * | 3/1994 | Miyazaki et al. ............ 363/146 |
| 5,479,358 A * | 12/1995 | Shimoda et al. ............. 700/291 |
| 5,572,604 A * | 11/1996 | Simard ........................ 382/224 |
| 6,397,166 B1 | 5/2002 | Leung et al. |
| 7,058,522 B2 * | 6/2006 | Chen ............................. 702/60 |
| 7,085,660 B2 * | 8/2006 | Mansingh et al. ............. 702/60 |
| 7,305,282 B2 * | 12/2007 | Chen ........................... 700/291 |

(Continued)

FOREIGN PATENT DOCUMENTS

EP    1 478 073 A2    11/2004

OTHER PUBLICATIONS

Hwang et al., "Short-term Power Load Forecasting by Neural Network with Stochastic Back-propagation Learning Algorithm", 2000.*

(Continued)

*Primary Examiner*—Michael B Holmes

(57) ABSTRACT

A system, method, and device for identifying data sources for a neural network are disclosed. The exemplary system may have a module for determining load curves for each selected data set. The system may also have a module for determining a global difference measure and a global similarity measure for each load curve of each selected data set. The system may have a module for determining a set of data sets with lowest value global difference measure. The system may also have a module for determining a set of data sets with largest value global similarity measure. The system may also have a module for determining a union of the sets of lowest value difference measure and the sets of largest value similarity measure. The system may also have a module for determining for each set in the union one of a local similarity measure and a local difference measure and a module for selecting a set of reduced data sets based on one of the local similarity measure and the local difference measure.

20 Claims, 7 Drawing Sheets

U.S. PATENT DOCUMENTS 7,321,810 B2 * 1/2008 Mansingh et al. ........... 700/286
2004/0133531 A1 7/2004 Chebn et al.

OTHER PUBLICATIONS

Drezga et al., "Short-Term Load Forecasting With Local ANN Predictors", 1999.*
Hsu et al., "Regional load forecasting in Taiwan—applications of artificial neural networks", 2002.*
Giacinto et al., "Design of Effective Multiple Classifier Systems by Clustering of Classifiers", 2000.*
Epter et al., "A Multiple-Resolution Method For Edge-Centric Data Clustering", 1999.*
Bourguet et al., "Artificial Neural Networks In Electric Power Industry", 1994.*
Kumar et al., "Software requirement understanding using Pathfinder networks: discovering and evaluating mental models", 2003.*
Bashir et al., "Short Term Load Forecasting by using Wavelet Neural networks", 2000.*
Hastie et al., "Discriminant Adaptive Nearest Neighbor Classification", 1996.*
Evaluation of cosine radial basis function neural networks on electric power load forecasting Karayiannis, N.B.; Balasubramanian, M.; Malki, H.A.; Neural Networks, 2003. Proceedings of the International Joint Conference on vol. 3, Jul. 20-24, 2003 pp. 2100-2105 vol. 3 Digital Object Identifier 10.1109/IJCNN.2003.1223732.*
An evolutionary fuzzy neural network approach for short-term electric power load forecasting Gwo-Ching Liao; Power Engineering Society General Meeting, 2006. IEEE Jun. 18-22, 2006 p. 6 pp. Digital Object Identifier 10.1109/PES.2006.1709220.*
Application of Pattern Recognition and Artificial Neural Network to Load Forecasting in Electric Power System Dai, Wenjin; Wang, Ping; Natural Computation, 2007. ICNC 2007. Third International Conference on vol. 1, Aug. 24-27, 2007 pp. 381-385 Digital Object Identifier 10.1109/ICNC.2007.260.*
Improvement of input-output correlations of electric power load forecasting by scatter searchMizutani, A.; Yukawa, T.; Numa, K.; Kuze, Y.; Iizaka, T.; Yamagishi, T.; Matsui, T.; Fukuyama, Y.; Intelligent Systems Application to Power Systems, 2005. Proceedings of the 13th International Conference on Nov. 6-10, 2005 p. 5 pp.*
The representation of large numbers in neural networks and its application to economical load dispatching of electric power Matsuda, S.; Akimoto, Y,; Neural Networks, 1989. IJCNN., International Joint Conference on Jun. 18-22, 1989 pp. 587-592 vol. 1 Digital Object Identifier 10.1109/IJCNN.1989.118637.*
A study on the effects of environmental factors for the forecasting of electric power load Neocleous, C.C.; Schizas, C.N.; Electrotechnical Conference, 2000. MELECON 2000. 10th Mediterranean vol. 3, May 29-31, 2000 pp. 1185-1188 vol. 3.*
Electric Load Forecasting using Scatter Search Based Weighted Average Weather Conditions Kobayashi, M.; Yukawa, T.; Kuze, Y.; Matsui, T.; Iizaka, T.; Fukuyama, Y.; Neural Networks, 2006. IJCNN '06. International Joint Conference on 0-0 0 pp. 3754-3759 Digital Object Identifier 10.1109/IJCNN.2006.247393.*
A New Intelligent Method for Power Load Forecasting Wei Li; Renhui Huang; Jie Bai; Xiue Yuan; Dongxiao Niu; Intelligent Systems Design and Applications, 2006. ISDA '06. Sixth International Conference on vol. 1, Oct. 2006 pp. 1098-1103 Digital Object Identifier 10.1109/ISDA.2006.65.*
Deok-Hwan Kim, Seok-Lyong Lee, Chin-Wan Chung; "Heterogeneous Image Database Selection on the Web"; The Journal of Systems and Software; Nov. 15, 2002; pp. 131-149; vol. 64, No. 2; XP-002428035; ISSN: 0164-1212; Elsevier, USA.
Charley Kleissner; "Data Mining for the Enterprise"; Proceedings of the Thirty-First Hawaii International Conference on Kohala Coast, HI; Jan. 6-9, 1998, pp. 295-304; vol. 7; XP010262792; ISBN: 0-8186-8255-8; Los Alamitos, CA, US.
Brian Linden et al.; Oracle 7™ Server SQL Language Reference Manual; Aug. 1993; pp. 3-2 thru 3-3, 3-10 thru 3-13, 3-30 thru 3-33, 3-40 thru 3-43, 3-46 thru 3-47, 3-52 thru 3-53; Oracle Corporation Part No. A12714-1; XP002427358.

* cited by examiner

FIG. 6   600

If the next day is between Tuesday and Thursday inclusively, then any weekdays between Tuesdays and Thursdays of the same week inclusively may be included in the selected set of dates
602

↓

If the next day is Monday, then previous Mondays, Sundays and Tuesdays are included in the selected set of dates
604

↓

If the next day is Friday, then previous Thursdays, Fridays and Saturdays are included in the selected set of dates
606

↓

If the next day is any weekend day, then previous Fridays, weekends and Mondays are included in the selected set of dates
608

↓

If the next day is a holiday, then the previous same holidays and days preceding or following these holidays by no more than two days are included in the selected set of dates
610

↓

The date corresponding to the reference load curve is not included in the selected set of dates
612

IDENTIFY DATA SOURCES FOR NEURAL NETWORK

CROSS REFERENCE TO RELATED APPLICATIONS

This application is related to U.S. Provisional Patent Application Nos. 60/649,677, 60/649,877, 60/649,876, and 60/649,803, all filed on Feb. 3, 2005 which are incorporated fully herein by reference.

TECHNICAL FIELD

The present invention relates to identifying data sources for neural networks and more particularly, to a device, method, and system for identifying matching data sources for a neural network based on very short term load prediction.

BACKGROUND INFORMATION

An Artificial Neural Network (ANN) is a device in which several interconnected elements process information simultaneously, adapting and learning from past patterns. The ANN may be used to predict future responses of a control system that varies with time. For example, electric power consumption in the power generation industry may vary with time. In order to operate the power generation equipment efficiently it may be useful to identify future consumption patterns. Very Short Term Load Predictor (VSTLP) provides a tool for estimating demand for the system power output over a predetermined future time period, for example, 60 minutes or less from the current point in time.

The neural-network-based very short term load predictor (VSTLP) requires that the actual load data sources be determined and made available for offline training of neural networks that are to be used for online prediction and further online training/tuning to improve prediction accuracy performance. The load data of up to five full-day-long load curves is used for offline neural network training. A full-year worth of load data at a specified time interval is stored in the VSTLP database with 10-year worth of load data for holidays stored as well. Accordingly, a need exists for a device, method, and system that make efficient use of the off-line data to provide training of ANN-based VSTLP.

SUMMARY

The present invention is a novel device, system, and method for identifying data sources for a neural network. The exemplary method may determine load curves for each selected data set. The method may determine a global difference measure and a global similarity measure for each load curve of each selected data set. The method may then determine a set of data sets with lowest value global difference measure and determine a set of data sets with largest value global similarity measure. The method may then determine a union of the sets of lowest value difference measure and the sets of largest value similarity measure. For each set in the union the method may determine either a local similarity measure or a local difference measure and select a set of reduced data sets based on either the local similarity measure or the local difference measure.

The invention may include the following embodiments. In one exemplary embodiment the method may select the set of reduced data sets from the sets in the union based on data sets with the largest value of the local similarity measure. In another embodiment the method may select the set of reduced data sets from the sets in the union based on data sets with the smallest value of the local difference measure. In another embodiment, the data sets may be data for a one-day period and the method may modify the reference load curve based on Daylight Savings Time. In yet another embodiment, the method may select the selected data set's days based on a reference day data set. The selected data set's days may involve the method selecting the selected data sets from data sets including any weekdays between Tuesdays and Thursdays of the same week when the next day after the reference day is between Tuesday and Thursday inclusively; selecting the selected data sets from data sets including previous Mondays, Sundays and Tuesdays when the next day after the reference day is Monday; and selecting the selected data sets from data sets including previous Thursdays, Fridays and Saturdays when the next day after the reference day is Friday. The method may also select the selected data sets from data sets including previous Fridays, weekends and Mondays when the next day after the reference day is any weekend day and select the selected data sets from data sets including the previous same holidays and days preceding or following these holidays by no more than two days when the next day after the reference day is a holiday.

It is important to note that the present invention is not intended to be limited to a system or method which must satisfy one or more of any stated objects or features of the invention. It is also important to note that the present invention is not limited to the exemplary embodiments described herein. Modifications and substitutions by one of ordinary skill in the art are considered to be within the scope of the present invention, which is not to be limited except by the following claims.

BRIEF DESCRIPTION OF THE DRAWINGS

These and other features and advantages of the present invention will be better understood by reading the following detailed description, taken together with the drawings herein:

FIG. 6 is a flow chart of a reduced data set method according to a reduced data set selection exemplary embodiment of the present invention.

DETAILED DESCRIPTION

The present invention provides a neural-network-based very short term load predictor (VSTLP). Aspects of VSTLP are described in greater detail and incorporated by reference herein in U.S. patent applications 2004/0249775 to Chen, 2004/0246643 to Chen, 2004/0257059 to Mansingh et al., 2004/0260489 to Mansingh et al., and 2004/0257858 to Mansingh et al. The VSTLP may require that the actual load data sources be determined and made available for offline training of neural networks that are to be used for online prediction and further online training/tuning to improve prediction accuracy performance.

The load data of up to five full-day-long load curves is used for offline neural network training. A full-year worth of load data at a specified time interval is stored in the VSTLP database with 10-years worth of load data for holidays stored as well. The dates of these load curves are used to identify the underlying load data sources. In other words, the load data sources are specified by the corresponding dates. The determination of the actual load data sources used for neural network training is done by two phases. The first phase may involve the user specifying one or more of the dates of the data sources. The second phase may involve utilizing the exemplary algorithms, described later herein, to find the remaining best matching dates that have closest load curves. The date of the first load data source may be specified by the user. The first load data set may be used to produce a reference load curve. The additional date data sets, for example four, can be either specified by the user or found by the proposed algorithms.

Figure 1:
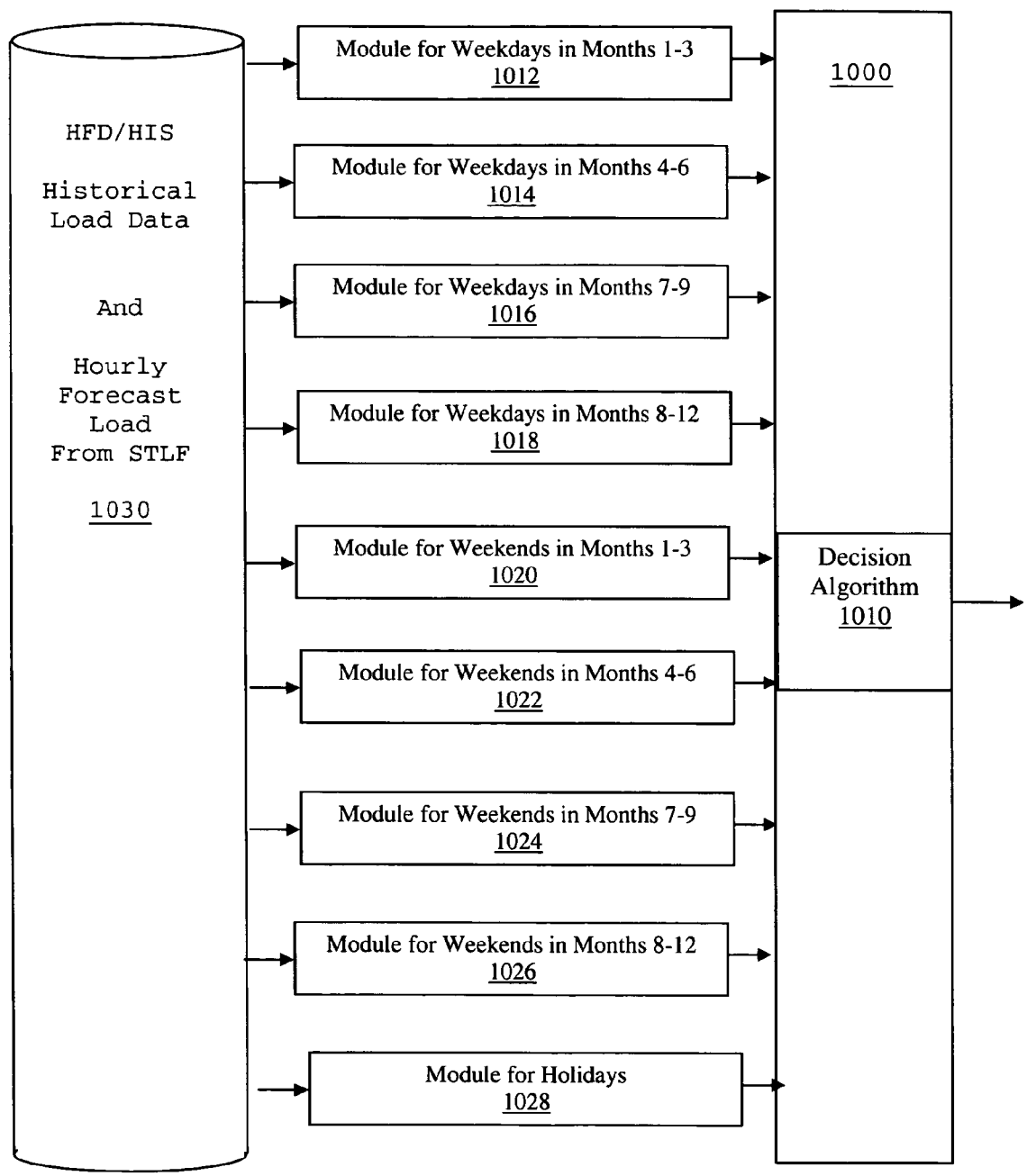
FIG. 1 is a block diagram of a system according to the exemplary ANN-based VSTLP embodiment 1000 of the present invention.

Referring to FIG. 1, the Very Short Term Load Prediction (VSTLP) module 1000 is a tool for predicting short term system loads. VSTLP module 1000 uses a set of neural networks to predict the system load for short term periods and in short term intervals, such as predicting the load of the system for the next 30-minutes, in 1-minute increments. The VSTLP module 1000 uses past load data and Short Term Load Forecast (STLF) data from STFL module (not shown), if available, to anticipate upcoming load trends in the next 15 minutes.

The VSTLP module 1000 uses artificial neural network (ANN) techniques to predict load requirements. Since the load differs greatly for weekdays and weekends, and varies among different weekdays, and has different dynamics from time to time during individual days, the ANN-based VSTLP module 1000 has the functional capability to, among other features, distinguish between different seasons (for instance, summer and winter); distinguish between weekends, holidays and weekdays; distinguish between off-peak times and on-peak times; predict the next period (15 1-minute) load values which conform to the dynamics of recent time period(s) (for instance, the past 15 minutes); and to conform to the hourly average values of load that is forecasted by STLF module function or equivalent outside sources.

The VSTLP module 1000 may not directly take weather information as a consideration or input since such weather information is already accounted for and modeled by the STLF module. However, it should be understood that day patterns may be obtained from weather adaptive load forecasts and/or manually entered. Nevertheless weather variation information will not be directly used (although other embodiments may) in the ANN-based VSTLP 1000, but the hourly forecasted load values by the STLF are to be used to adjust the minutely forecasted load values by the ANN-based VSTLP 1000.

To account for load changes along with seasons, weekdays/weekends/holidays, and off-peak/on-peak times, the neural networks may be trained to capture the load patterns that occur at a specific season, a specific day, and a specific time period of the day. Initially, a year may be split up into spring (Months 1 to 3), summer (months 4 to 6), fall (months 7 to 9) and winter (months 10 to 12). This split can be reconfigured according to real-world load characteristics at a specific location where this VSTL module 1000 is intended for use. Load shapes for weekends (Saturdays and Sundays) for example are dissimilar to those of weekdays (Mondays through Fridays). Division between weekdays and weekends may be performed and based on constructed, real world situations. For instance, weekends may include Saturdays, Sundays and Mondays, and weekdays may include Tuesdays through Fridays. Generally, load shapes for both weekdays and weekends are generally recurrent. However, the load shapes of holidays are quite different from those of normal weekdays/weekends. Special care may be given to the treatment of holidays, in particular, big holidays such as Thanksgiving holidays and Christmas holidays. Load shapes of neighboring days preceding holidays and following holidays are also affected. For example, the period from 6:00 pm on the day immediately preceding a holiday to 9:00 pm on the day immediately following the holiday will be regarded as holiday time when collecting data for training neural networks associated with VSTLP 1000.

Figure 2:
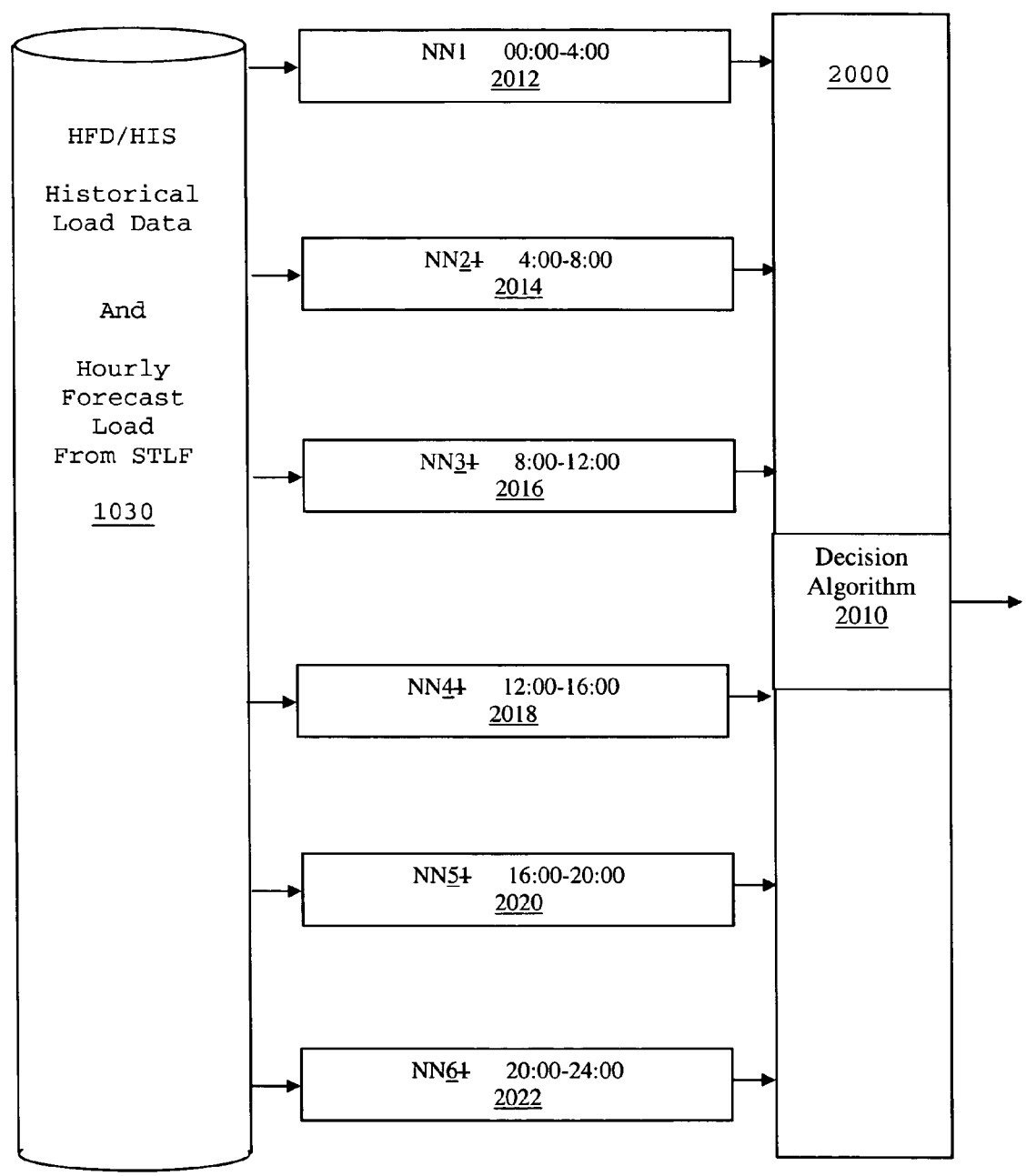
FIG. 2 is a block diagram of a daily system according to the exemplary ANN-based VSTLP embodiment 2000 of the present invention.

Shown in FIG. 1 is an ANN-based VSTLP architecture. The Decision Algorithm 1010 in FIG. 1 processes the forecasted load values from respective ANN VSTLP modules 1012 through 1028 (weekdays, months, weekends, and holidays), at the end of each time constraint and minimizes the effects due to ANN VSTLP module 1000 switching. The Decision Algorithm 1010 may be realized through the use of neural networks. Over a smaller time period and as shown in FIG. 2, for each individual day, 6 neural networks (NN1, NN2, NN3, NN4, NN5 and NN6) will be used to cover the 24-hour period (time period). In this embodiment each neural network is responsible for a 4-hour period (sub-period), although other time allocations and number of neural networks may be used. For instance, NN1, NN2, NN3, NN4, NN5 and NN6 cover 12:00 am to 4:00 am, 4:00 am to 8:00 am, 8:00 am to 12:00 pm, 12:00 pm to 16:00 pm, 16:00 pm to 20:00 pm, and 20:00 pm to 12:00 am, respectively. To ensure the smooth transition from one 4-hour period to the next 4-hour period, one additional half-hour is added to both ends of each 4-hour period. For instance, NN1 covers 11:30 pm to 4:30 am, and NN2 covers 3:30 am to 8:30 am. The split of the entire day into 6 different 4-hour periods reflects the fact that loads are dynamic during the day. It should be understood that different allocations of time, overlaps and number of neural networks may be used. The use of multiple neural networks for different periods of the day allows for more accurate predictions. Such a split may be changed to comply with the patterns of real situations. Accordingly, each ANN VSTLP module 1012-1028 shown in FIG. 1 will have several ANN to predict load corresponding to a specific time period—this is also shown in FIG. 2.

The Decision Algorithm 1010 in the Daily ANN-based VSTLP diagram shown in FIG. 2 processes the forecasted load values from respective ANN VSTLP modules at the end of each time constraint and minimizes the effects due to the ANN VSTLP module switching. The Decision Algorithm Block 2010 may also be realized through the use of neural networks and may use linear or non-linear decision algorithm and neural network transfer functions. Each NN will be realized with one or two hidden layers depending on the complexity of load dynamics it has to learn. More specifically, one or more neurons may be used in each neural network with varying weights and biases, linear and non-linear transfer functions. It should be understood that the input is affected by the weights and biases assigned to each neuron.

In the equations below, load is denoted by P. The forecast load values for the next 15 minutes can be expressed as a function of the current load and the previous N 1-minute load values:

$$\hat{P}_{n+i} = f_i(n, P_n, P_{n-1}, P_{n-2}, \ldots, P_{n-N})$$

Where $P_{n+i}(1 \leq i \leq M)$ is the predicted load for the future ith step (in minutes) from current time n. $P_n, P_{n-1}, P_{n-2}, \ldots, P_{n-N}$ are the actual load values for current time and the previous N minutes. In this illustration, M is assigned a value of 15. The choice of N depends on the complexity of load dynamics, and will be determined through a trial-and-error experimental approach along with any available a priori information on load dynamics.

It is observed that in the above equation, the dynamics are time varying. However, the time-varying effect may be neglected within any of the individual time periods that are properly segmented within an entire day of 24 hours (23 or 25 when DST is present). The load dynamics vary from one individual time period to another. Accordingly, several NNs are used to deal with time-varying load dynamics. Within each individual time period, the load dynamics can be simply represented by $$\hat{P}_{n+i} = f_i(P_n, P_{n-1}, P_{n-2}, P_{n-N})$$

The above equation can be rewritten in vector format as follows:

$$\begin{bmatrix} \hat{P}_{n+1} \\ \hat{P}_{n+2} \\ \vdots \\ \hat{P}_{n+M} \end{bmatrix} = \begin{bmatrix} f_1 \\ f_2 \\ \vdots \\ f_M \end{bmatrix}(P_n, P_{n-1}, P_{n-2}, \ldots, P_{n-N})$$

Since $f_1, f_2, \ldots, f_M$ are all unknown, and the exact forms of these functions are not known, with historical load data available, a feed-forward neural network with proper layers may be trained to approximate such functions.

$$\begin{bmatrix} \hat{P}_{n+1} \\ \hat{P}_{n+2} \\ \vdots \\ \hat{P}_{n+M} \end{bmatrix} = NN(P_n, P_{n-1}, P_{n-2}, \ldots, P_{n-N}; \theta)$$

Where $\theta$ is a parameter vector that contains weights between neighboring layers, and biases for all the neurons, and is to be tuned in a way such that the discrepancy between the calculated values for the future times and actual values is minimized in terms of a performance index.

Neural networks are trained off-line using historical load data. After the completion of neural network training and validation, they are ready to be used on-line. Retraining may be done on a daily basis to tune the weights to take into account the exhibited load characteristics for the just previous day. Online update of weights may also be possible.

When actual values $P_n, P_{n-1}, P_{n-2}, \ldots, P_{n-N}$ are available, forecasted load values $P_{n+i}(1 \leq i \leq M)$ can be computed immediately. When some of the actual values for $P_n, P_{n-1}, P_{n-2}, \ldots, P_{n-N}$ are not available, estimates generated from ANN-based VSTLP at previous times will be used instead, and further future loads can be forecast. This can be done iteratively until all the minutely forecasted values for a whole hour are computed, as shown in FIG. 3.

Figure 3:
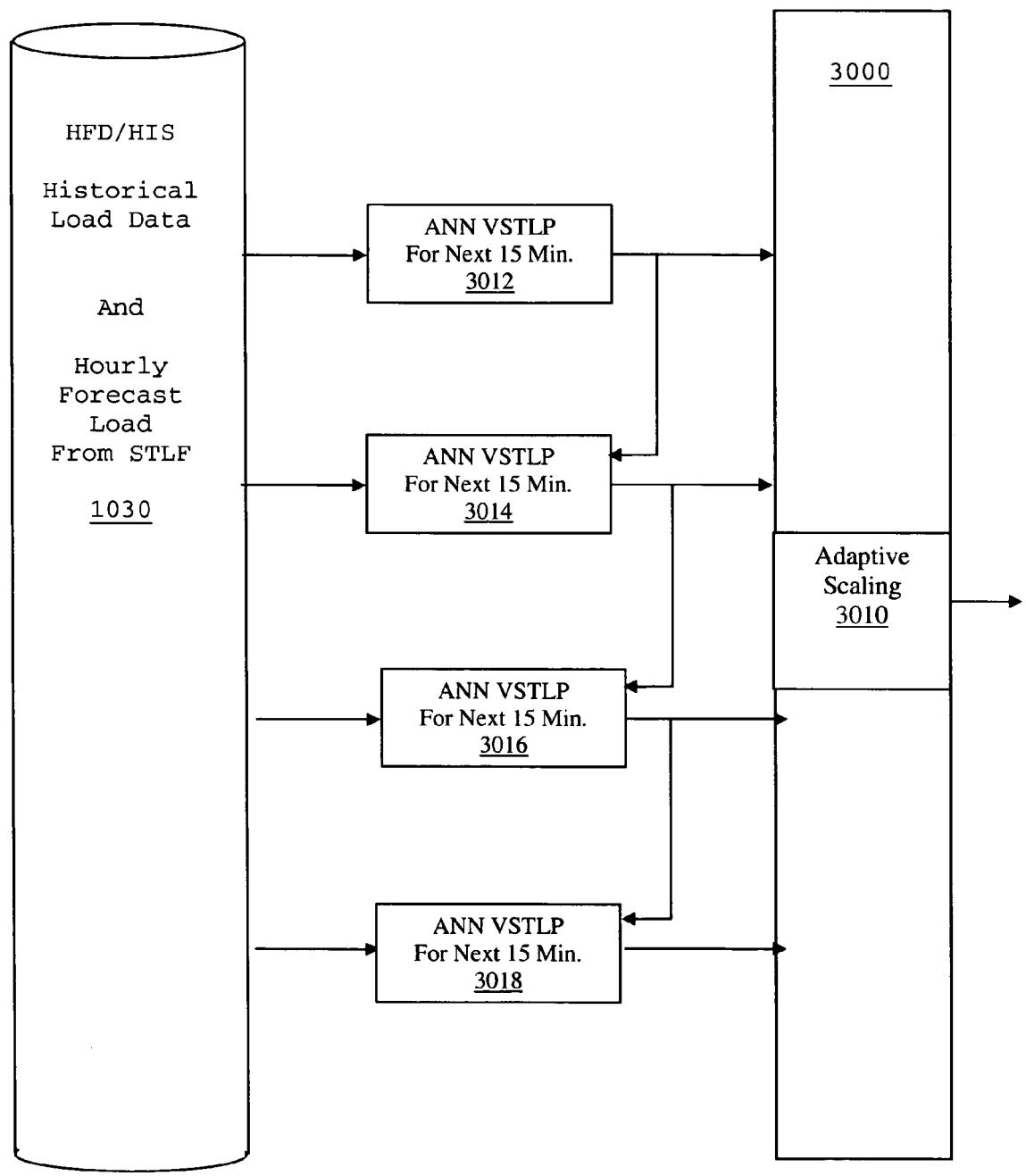
FIG. 3 is a block diagram of a system for the next hour according to the exemplary ANN-based VSTLP embodiment 3000 of the present invention.

The Adaptive Scaling Block 3010 in the ANN-based VSTLP for Next Hour diagram FIG. 3 processes the incoming raw minutely forecasted load values from the four ANN-based VSTLP modules 3012-3018. Each of these VSTLP modules 3012-3018 is responsible for 15 minutes long prediction time interval, and for scaling them based on the hourly forecasted load values from the STLF.

It is assumed that the number of inputs, M, will not be larger than 15. Therefore, at any instant time n, and when starting to predict the load values for the next hour, the first ANN-based VSTLP will calculate the load values for the next 15 minutes, namely, $P_{n+i}(1 \leq i \leq 15)$ based on the actual previous load values. When predicting the load values for the time period from n+16 to n+30, the second ANN-based VSTLP will use some of the available minutely forecasted load values $P_{n+i}(1 \leq i \leq 15)$ since actual load values for this time period are not available yet. In the same manner, the predicted load values from the second ANN-based VSTLP for the time period from n+16 to n+30 are {circumflex over $P_{n+i}$}$(16 \leq i \leq 30)$. Similarly, the third and fourth ANN-based VSTLPs will generate the predicted load values for another 15 minutes each, that is, $P_{n+i}(31 \leq i \leq 15)$, and $P_{n+i}$ $(46 \leq i \leq 60)$. These four ANN-based VSTLPs all together generate predicted load values for the next 60 minutes. However, some of these forecasted load values will not be used in adaptive scaling if the time stamp associated with them is beyond the current hour. If the current time instant n is i minutes after the hour, then within the hour, for the time period from n−i+1 to n, $P_{n-i+1}, P_{n-i+2}, P_{n-i+3}, \ldots, P_n$ actual values are available, and for the rest of the time periods within the hour, only predicted values (circumflex over $P_{n+k}$ $(1 \leq k \leq 60-i)$ are available. The forecasted load values $P_{n+k}$ $(60-i+1 \leq k \leq 60-i)$ will be discarded or prediction for the corresponding time period will not be performed at all depending on the eventual implementation.

For example, let the scaling factor be $s_n$, and let the hourly forecasted load value from STLF for the current hour be $P_{stlf}$. To make the minutely forecasted load values within the hour conform to the hourly forecasted load value from STLF with satisfactory accuracy, the following relationship is used:

$$\sum_{k=-i+1}^{0} P_{n+k} + s_n \sum_{k=1}^{60-i} \hat{P}_{n+k} = P_{stlf}$$

and thus, $$s_n = \frac{P_{stlf} - \sum_{k=-i+1}^{0} P_{n+k}}{\sum_{k=1}^{60-i} \hat{P}_{n+k}}$$

Then the modified minutely forecasted load values for the future time period from n+1 to n+60−i within the current hour are $s_n P_{n+k}(1 \leq k \leq 60-i)$. It should be understood however, that $s_n$ is time varying with the minutely update of 15-minute sliding window of prediction. The temporal behavior of $s_n$ is also an indicator of ANN-based VSTLP's performance. If $s_n$ fluctuates around 1 with a small magnitude (or substantially around 1), it indicates that the ANN-based VSTLP performs reasonably well in the sense that the minutely forecasted load values generated from ANN-based VSTLP conform to the hourly forecasted load values from STLF with the assumption that STLF fully captures the hourly load patterns with satisfactory accuracy. In addition, it should be noted that non-conforming load(s) must be dealt with and processed separately, or filtered out to minimize or remove its influence on the prediction accuracy of the ANN-based VSTLP. Moreover, in certain instances the STLF should be greater than the largest prediction interval for which load predictions are made.

The historical load data stored in HFD/HIS 1030 must be formulated in a proper format before it can be used in training neural networks of the ANN-based VSTLP. This can be achieved by an interface program, which retrieves the historical data from HFD/HIS, reformats it and passes it to the main program responsible for neural network training. The historical data is preferably separated into two different sets. The first set of data is used to train the neural networks while the second set of data is used to evaluate the performance of the trained neural networks to avoid the over-training of the neural networks. Based on performance evaluation, the number of training epochs can be specified and final training can be achieved with all available and useful historical data. Information relating to the ANN-based VSTLP 1000, for example, the number of layers, number of neurons in each layer, activation functions, weights and biases, etc., will be saved in a file.

The structural and parametric information about the ANN-based VSTLP 1000 is retrieved to initialize neural networks of the ANN-based VSTLP. Same as for VSTLP offline training, an interface program retrieves historical load data from HFD/HIS 5030 or other online application programs that temporarily stores historical load data and passes it to the initialized neural networks for load forecast. Generated minutely forecasted load values will be used for generation, scheduling, and display purposes. In addition these load values will also be stored for after-the-fact performance evaluation.

Online updating of weights and biases of the neural networks can be done by using the immediately-past actual load values and the forecasted load values generated from the neural networks. This is done with the understanding that past load characteristics may be used to improve the accuracy of immediate future load predictions. Beyond a certain time period (e.g., a time segment that is defined for example by the Daily ANN-based VSTLP diagram), the weights and biases are discarded, and the original weights and biases are reloaded. Updating of weights and biases can also be achieved on a monthly, weekly, daily, hourly or even smaller time granularity basis depending on real world situations.

The algorithms of the first and second exemplary embodiments take into account the two requirements: the candidate load curve is similar to the user-specified reference load curve and the candidate load curve exhibits a certain degree of deviation from the reference load curve. The first requirement may require that the selected load curve stays close to the reference curve so that the main load trend exhibited by these load curves is outstanding for the neural network to capture through training. The second requirement may demand that the selected load curve vary around the reference curve so that the neural network has the capability to generalize after the training is completed.

The first load curve specified by the user is regarded as the reference load curve, denoted by $C^r(t)$ with $t \in (0,1440]$ (t is in minutes). The daylight savings time (DST) may be handled as such: for the long DST day, the load data for the duplicated hour is not used; for the short DST day, the load data for the second hour is duplicated for the time period from 2:00:00am-2:59:00am. With this treatment, every day has a load curve that has 1440 1-minute load data points, or 288 5-minute load data points. For illustration purposes but without loss of generality, we assume that a load curve has 1440 1-minute load data points.

The load curves of the best matching dates (yet to be identified based on the algorithms of the exemplary embodiments) may be denoted by $C_i^m(t)$ for $i \in [1,N]$ with $N \leq 4$. The load curve of any date stored in the VSTLP database may be denoted by $C_k^n(t)$ with the subscript k for identifying any date in a year, $1 \leq k \leq 365$ and n for identifying the year in case of a holiday search. The objective is to find $C_i^m(t)$'s out of $C_k^n(t)$'s.

Figure 4:
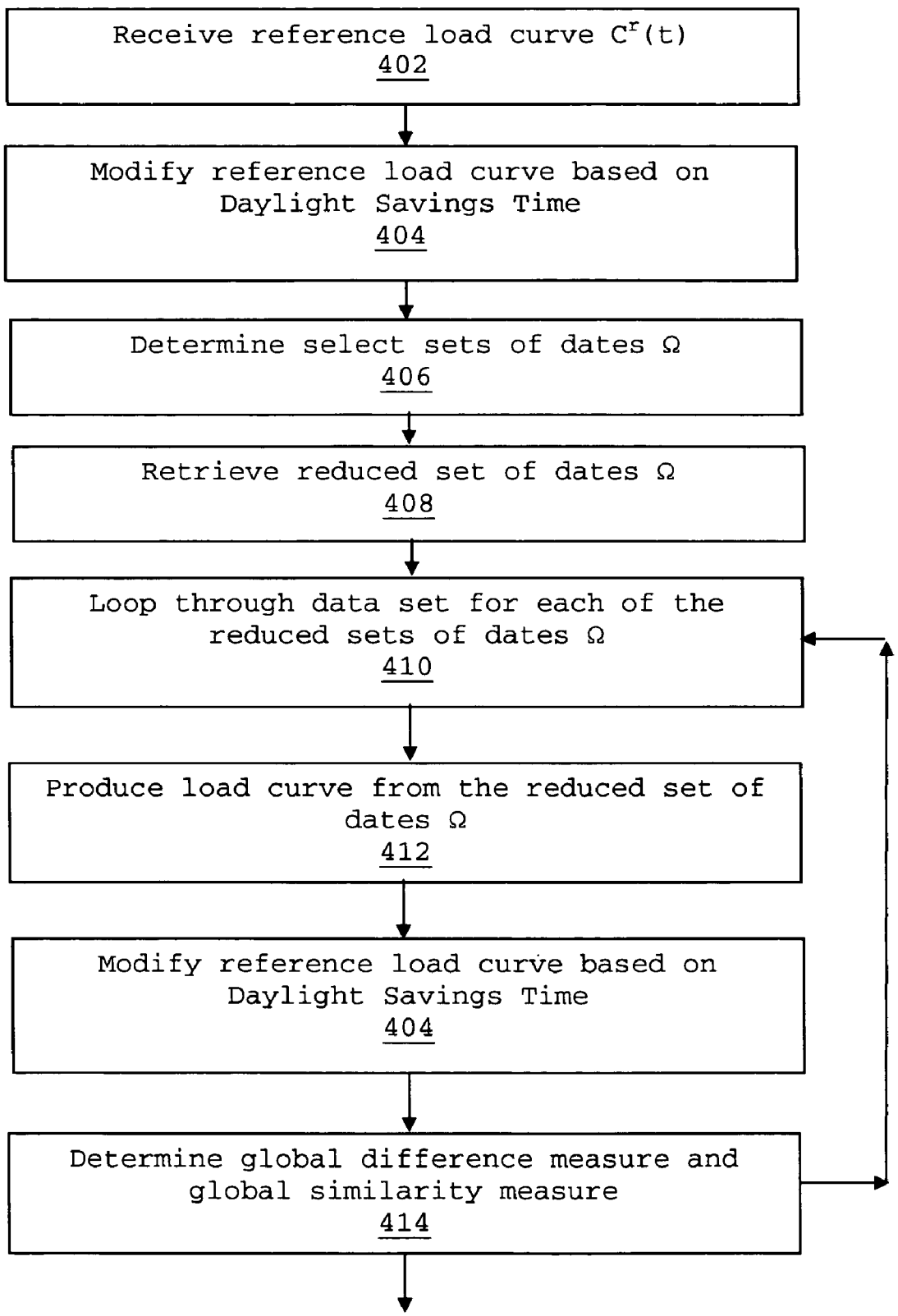
FIG. 4 is a flow chart of an initial method according to first and second exemplary embodiments of the present invention.

Referring to FIG. 4, a first exemplary algorithm 400 makes use of the entire load curve matching as well as partial load curve matching. The user supplies a reference date and the system retrieves the reference data of reference load curve $C^r(t)$ (block 402). The system may make DST adjustment $t \in (0,1440]$, as previously described herein (block 404). The system determines a reduced set of dates based on what day of the week of the next day (i.e., day after the reference day) (block 406). Once the set of dates are determined, the load data of these dates is retrieved from VSTLP database (block 408). The data may be stored in a particular table that stores a full-year worth of load data. The selection of best matching dates (hence load data for neural network training) may be done on the current day, and the trained neural networks are used to predict the load shape of the next day. The screening procedure to determine the reduced set of dates Ω is described in greater detail with reference to FIG. 6 as described later herein.

The system loops through the reduced set of dates Ω (block 410). The system may retrieve one load curve from the VSTLP database at a time, $C_k^n(t)$ (block 412). The system may make necessary DST adjustment $t \in (0,1440]$ as previously discussed to each set of date data sets (block 413). For each date data set, the global difference measure and similarity measure for each curve $C_k^n(t)$ is computed (block 414). The integrated square of difference between the reference curve $C^r(t)$ and $c_k^n(t)$ $$A_1(n,k) = \sum_{t=1}^{1440} (C_k^n(t) - C^r(t))^2.$$

The similarity of curve $C_k^n(t)$ to the reference curve $$C^r(t): A_2(n,k) = \frac{\sum_{t=1}^{1440} C_k^n(t) \times C^r(t)}{\sqrt{\sum_{t=1}^{1440} (C_k^n(t))^2} \sqrt{\sum_{t=1}^{1440} (C^r(t))^2}}$$

Figure 5:
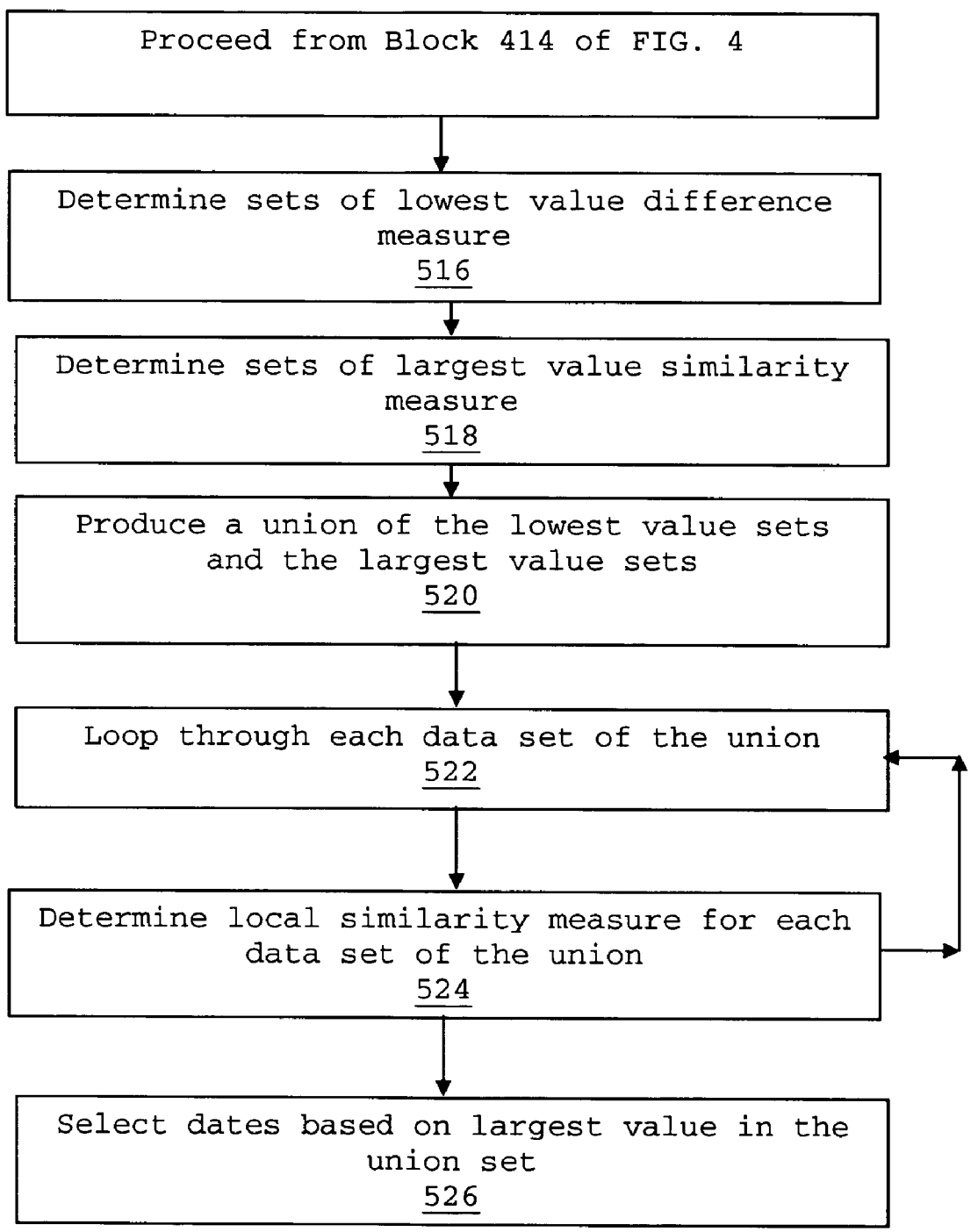
FIG. 5 is a flow chart of a continuing method according to a first exemplary embodiment of the present invention.

Referring to FIG. 5, the system may sort all the $A_1(n,k)$'s to pick up the desired number lowest values such that $A_1(n_1,k_1) \leq A_1(n_2,k_2) \leq A_1(n_3,k_3) \leq A_1(n_4,k_4) \leq A_1(n,k)$ where the pair (n,k) identifies a unique date (date k in year n) which is neither of the four identified dates $(n_1,k_1)$, $(n_2,k_2)$, $(n_3,k_3)$, $(n_4,k_4)$, and the reference date defining $D_1=\{(n_1,k_1),(n_2,k_2),(n_3,k_3),(n_4,k_4)\}$ (block 516). According to the exemplary embodiment herein the desired number is four, however, the invention is not limited to four sets.

The system may also sort all the $A_2(n,k)$'s to pick up the four largest values such that $A_2(n_5,k_5) \leq A_2(n_6,k_6) \leq A_2(n_7,k_7) \leq A_2(n_8,k_8) \leq A_2(n,k)$ where the pair (n,k) identifies a unique date which is neither of the four identified dates $(n_5,k_5)$, $(n_6,k_6)$, $(n_7,k_7)$, $(n_8,k_8)$, and the reference date defining $D_2=\{(n_5,k_5),(n_6,k_6),(n_7,k_7),(n_8,k_8)\}$ (block 518). Similarly, according to the exemplary embodiment herein the desired number is four, however, the invention is not limited to four sets. The system may then produce a union set of dates $D=D_1 \cup D_2$ to remove any duplicated dates so D may have at least four dates and at most eight dates according to the exemplary embodiment (block 520).

The system then loops through the set of dates D, for each date identified by the pair (n,k) (block 522). The system according to the first exemplary embodiment may compute the following local similarity measure (block 524). The local similarity measure provides the similarity of curve $C_k^n(t)$ to the reference curve $C_r(t)$ over the time segment $T=\{t|N_1 \leq t \leq N_2\}$ for which a neural network is trained to be responsible for providing load prediction. Defined as:

$$A_3(n, k) = \frac{\sum_{t=N_1}^{N_2} C_k^n(t) \times C^r(t)}{\sqrt{\sum_{t=N_1}^{N_2} (C_k^n(t))^2} \sqrt{\sum_{t=N_1}^{N_2} (C^r(t))^2}}.$$

As previously discussed, an entire day is split into multiple non-overlapping time segments and for each time segment there is a neural network designed and trained to be responsible for providing load prediction. As load increments are used for training and prediction, the local similarity measure is more sensible than the local difference measure, as discussed in greater detail with regards to the second exemplary embodiment. The system sorts all the $A_3(n,k)$'s to pick N ($N \leq 4$ depending on how many automatically generated matching dates are needed) largest values and find the corresponding dates—the best matching dates that offer best load curve matching according to the applied three matching criteria: $A_1, A_2, A_3$ (block 526).

Referring to FIG. 6, the system determines a reduced set of dates based on the day of week of the next day (i.e., day after the reference day) (block 406) according to the reduced date data set selection embodiment 600. If the system determines the next day is between Tuesday and Thursday inclusively, then any weekdays between Tuesdays and Thursdays of the same week inclusively may be included in the selected set of dates (block 602). If the system determines the next day is Monday, then previous Mondays, Sundays and Tuesdays are included in the selected set of dates (block 604). If the system determines the next day is Friday, then previous Thursdays, Fridays and Saturdays are included in the selected set of dates (block 606). If the system determines the next day is any weekend day, then previous Fridays, weekends and Mondays are included in the selected set of dates (block 608). These actions allow the system to take into account the day of week selected for the data sets.

The system may also take into account holidays when selecting dates for the reduced set of data. If the system determines the next day is a holiday, then the previous same holidays and days preceding or following these holidays by no more than two days are included in the selected set of dates (block 610). In addition the system may prevent the reference date from being used as a data set (block 612). The system may provide a reduced set of dates taking into account the day of the week of the reference date and holidays.

Incremental load curves are formed out of load curves. An incremental load curve denoted by $\Delta C_k^n(t)(t \in (0,1440])$ is formed out of load curve $C_k^n(t)$ where $t \in [0,1440]$. The time interval used for the exemplary embodiments is 1 minute, but the invention is not limited to 1 minute increments. A variety of increments may be used, for example the increment may be 5 minutes, and in that case, $t \in (0,288]$. $\Delta C_k^n(t)=C_k^n(t)-C_k^n(t-1)$ for $\forall t \in (0,1440]$. The neural-network-based very short term load prediction provides a methodology to also base the training and prediction on load increments. To apply this methodology more effectively, load increment-based curve matching is an alternative choice.

Figure 7:
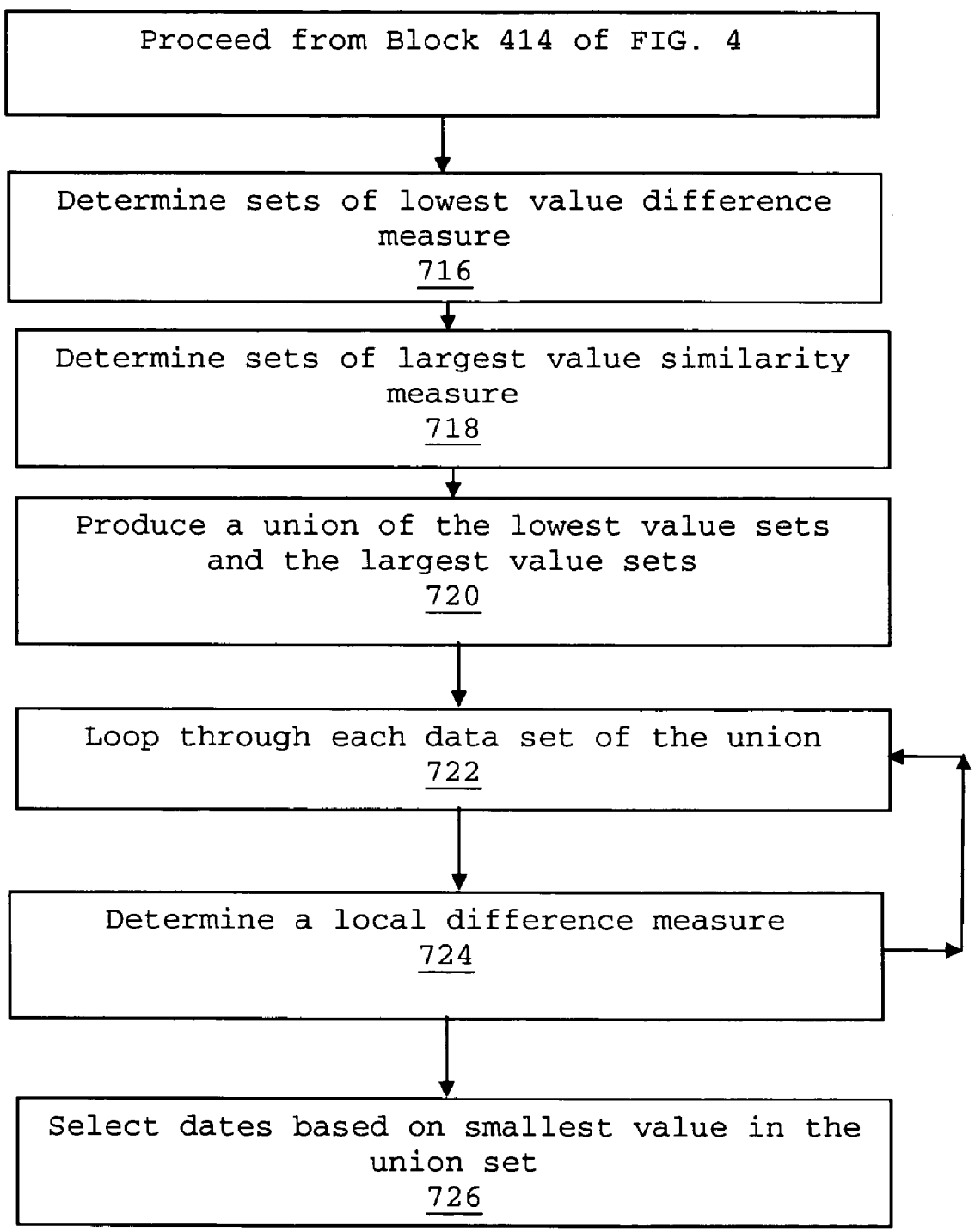
FIG. 7 is a flow chart of a continuing method according to a second exemplary embodiment of the present invention.

A second exemplary algorithm 700 also may make use of the entire load curve matching as well as partial load curve matching. The second exemplary algorithm 700 follows the same action as described with regard to FIG. 4 in the first exemplary algorithm 400. The second exemplary algorithm 700 continues from block 414 of FIG. 4 to block 716 in FIG. 7.

The system may sort all the $A_1(n,k)$'s to pick up the desired number lowest values such that $A_1(n_1,k_1) \leq A_1(n_2,k_2) \leq A_1(n_3,k_3) \leq A_1(n_4,k_4) \leq A_1(n,k)$ where the pair (n,k) identifies a unique date (date k in year n) which is neither of the four identified dates $(n_1,k_1), (n_2,k_2), (n_3,k_3), (n_4,k_4)$, and the reference date defining $D_1=\{(n_1,k_1),(n_2,k_2),(n_3,k_3),(n_4,k_4)\}$ (block 716). According to the exemplary embodiment herein the desired number is four, however, the invention is not limited to four sets.

The system may also sort all the $A_2(n,k)$'s to pick up the four largest values such that $A_2(n_5,k_5) \leq A_2(n_6,k_6) \leq A_2(n_7,k_7) \leq A_2(n_8,k_8) \leq A_2(n,k)$ where the pair (n,k) identifies a unique date which is neither of the four identified dates $(n_5,k_5), (n_6,k_6), (n_7,k_7), (n_8,k_8)$, and the reference date defining $D_2=\{(n_5,k_5),(n_6,k_6),(n_7,k_7),(n_8,k_8)\}$ (block 718). Similarly, according to the exemplary embodiment herein the desired number is four, however, the invention is not limited to four sets. The system may then produce a union set of dates $D=D_1 \cup D_2$ to remove any duplicated dates so D may have at least four dates and at most eight dates according to the exemplary embodiment (block 720).

The system then loops through the set of dates D, for each date identified by the pair (n,k) (block 722). The system according to the first exemplary embodiment may compute the following local difference measure (block 724). The system loops through the set of dates D, for each date identified by the pair (n,k) and computes the local difference measure. The integrated square of difference between the reference curve $\Delta C^r(t)$ and $\Delta C_k^n(t)$ over the time segment $T=\{t|N_1 \leq t \leq N_2\}$ for which a neural network is trained to be responsible for providing load prediction:

$$A_3(n, k) = \sum_{t=N_1}^{N_2} (\Delta C_k^n(t) - \Delta C^r(t))^2.$$

An entire day is split into multiple non-overlapping time segments and for each time segment there is a neural network designed and trained to be responsible for providing load prediction. As load increments have already been used for entire curve matching, the local difference measure may be more sensible than the local similarity measure of the first exemplary embodiment. The system sorts all the $A_3(n,k)$'s to pick N($N \leq 4$ depending on how many automatically generated matching dates are needed) smallest values (block 726). The system finds the corresponding dates—the best matching dates that offer best load curve matching according to the applied three matching criteria: $A_1, A_2,$ and $A_3$.

The system and methods used in the first exemplary embodiment 400 and second exemplary embodiment may be implemented in a variety of ways. The exemplary embodiment uses data sets for power generation at various periods in time. The invention is not limited to power generation data. The ANN VSTLP may be used for a variety of modeling and training purposes as one skilled in the art will appreciate.

The systems and methods may be implemented using hard-wired modules or programmable hardware. The systems and methods may be implemented within software that utilizes various components to implement the embodiments described herein. Aspects disclosed in the exemplary embodiment may be utilized independently or in combination with other exemplary embodiments. Moreover, it will be understood that the foregoing is only illustrative of the principles of the invention, and that various modifications can be made by those skilled in the art without departing from the scope and spirit of the invention. Persons skilled in the art will appreciate that the present invention can be practiced by other than the described embodiments, which are presented for purposes of illustration rather than of limitation, and the present invention is limited only by the claims that follow.

What is claimed is:

1. A computer implemented system for making efficient use of data sources for use in offline training of a neural network for predicting electric power loads comprising:
   a processor for:
   calculating load curves for each of selected data sets;
   calculating a global difference measure and a global similarity measure for each load curve of each selected data sets;
   calculating a set of data sets with lowest value global difference measure;
   calculating a set of data sets with largest value global similarity measure;
   calculating a union of the sets of lowest value difference measure and the sets of largest value similarity measure;
   calculating for each set in the union one of a local similarity measure and a local difference measure;
   generating a set of reduced data sets based on one of the local similarity measure and the local difference measure effective to provide more efficient use of the data sets; and
   using the set of reduced data sets for performing offline training of a neural network for predicting electric power loads.

2. The system of claim 1, wherein the processor is further configured for generating the set of reduced data sets from the sets in the union based on data sets with the largest value of the local similarity measure.

3. The system of claim 1, wherein the processor is further configured for generating the set of reduced data sets from the sets in the union based on data sets with the smallest value of the local difference measure.

4. The system of claim 1, wherein the data sets are data for a one-day period and wherein the processor is further configured for modifying reference load curve based on Daylight Savings Time.

5. The system of claim 1, wherein the data sets are data for a one-day period and wherein the processor is further configured for generating the selected data set's days based on a reference day data set.

6. The system of claim 5, wherein the processor is further configured for generating the selected data sets from data sets including any weekdays between Tuesdays and Thursdays of the same week when the next day after the reference day is between Tuesday and Thursday inclusively; selecting the selected data sets from data sets including previous Mondays, Sundays and Tuesdays when the next day after the reference day is Monday; and selecting the selected data sets from data sets including previous Thursdays, Fridays and Saturdays when the next day after the reference day is Friday.

7. The system of claim 5, wherein the processor is further configured for generating the selected data sets from data sets including previous Fridays, weekends and Mondays when the next day after the reference day is any weekend day; and generating the selected data sets from data sets including the previous same holidays and days preceding or following these holidays by no more than two days when the next day after the reference day is a holiday.

8. A method for making efficient use of data sources for use in offline training of a neural network for predicting electric power loads comprising:
   calculating load curves for each selected data sets;
   calculating a global difference measure and a global similarity measure for each load curve of each selected data sets;
   calculating a set of data sets with lowest value global difference measure;
   calculating a set of data sets with largest value global similarity measure;
   calculating a union of the sets of lowest value difference measure and the sets of largest value similarity measure;
   calculating for each set in the union one of a local similarity measure and a local difference measure;
   generating a set of reduced data sets based on one of the local similarity measure and the local difference measure effective to provide more efficient use of the data sets; and
   using the set of reduced data sets for performing offline training of a neural network for predicting electric power loads.

9. The method of claim 8, further comprising the following actions:
   generating the set of reduced data sets from the sets in the union based on data sets with the largest value of the local similarity measure.

10. The method of claim 8, further comprising the following actions:
    generating the set of reduced data sets from the sets in the union based on data sets with the smallest value of the local difference measure.

11. The method of claim 8, wherein the data sets are data for a one-day period and further comprising the following actions:
    modifying reference load curve based on Daylight Savings Time.

12. The method of claim 8, wherein the data sets are data for a one-day period and further comprising the following actions:
    generating the selected data set's days based on a reference day data set.

13. The method of claim 12, further comprising the following actions:
    generating the selected data sets from data sets including any weekdays between Tuesdays and Thursdays of the same week when the next day after the reference day is between Tuesday and Thursday inclusively;
    generating the selected data sets from data sets including previous Mondays, Sundays and Tuesdays when the next day after the reference day is Monday; and
    generating the selected data sets from data sets including previous Thursdays, Fridays and Saturdays when the next day after the reference day is Friday.

14. The method of claim 12, further comprising the following actions:

generating the selected data sets from data sets including previous Fridays, weekends and Mondays when the next day after the reference day is any weekend day; and generating the selected data sets from data sets including the previous same holidays and days preceding or following these holidays by no more than two days when the next day after the reference day is a holiday.

15. The method of claim 12, further comprising the following actions:

generating the selected data sets of any day not including the reference day.

16. A computer implemented system for identifying matching data sources for more efficient use in offline training of a neural network of a neural network-based very short term load prediction for operating a power generation unit comprising:

a processor for:

calculating load curves for each of a selected date data sets;

calculating a global difference measure and a global similarity measure for each load curve of each selected date data sets;

calculating a set of date data sets with lowest value global difference measure;

calculating a set of date data sets with largest value global similarity measure;

calculating a union of the date data sets of lowest value difference measure and the date data sets of largest value similarity measure;

calculating for each date data set in the union one of a local similarity measure and a local difference measure;

generating a data set of reduced date data sets based on one of the local similarity measure and the local difference measure effective to provide more efficient use of the date data sets; and using the set of reduced date data sets for performing offline training of a neural network to predict electric power loads.

17. The system of claim 16, wherein the processor is further configured for generating the data set of reduced date data sets from the date data sets in the union based on date data sets with the largest value of the local similarity measure.

18. The system of claim 16, wherein the processor is further configured for generating the data set of reduced date data sets from the data sets in the union based on date data sets with the smallest value of the local difference measure.

19. The system of claim 16, wherein the processor is further configured for modifying reference load curves based on Daylight Savings Time.

20. The system of claim 16, wherein the processor is further configured for:

generating the selected date data sets from date data sets including any weekdays between Tuesdays and Thursdays of the same week when the next day after the reference day is between Tuesday and Thursday inclusively;

generating the selected date data sets from date data sets including previous Mondays, Sundays and Tuesdays when the next day after the reference day is Monday; and generating the selected date data sets from date data sets including previous Thursdays, Fridays and Saturdays when the next day after the reference day is Friday.

* * * * *